United States Patent [19]

Tosswill

[11] 4,305,643

[45] Dec. 15, 1981

[54] VIEWER

[75] Inventor: Christopher H. Tosswill, Sturbridge, Mass.

[73] Assignee: Galileo Electro-Optics Corp., Sturbridge, Mass.

[21] Appl. No.: 102,259

[22] Filed: Dec. 10, 1979

Related U.S. Application Data

[63] Continuation-in-part of Ser. No. 859,278, Dec. 12, 1977, abandoned.

[51] Int. Cl.³ ............................................. G02B 27/02
[52] U.S. Cl. ................................................... 350/167
[58] Field of Search .................... 350/167, 319, 17, 91, 350/433; 356/241; 235/454, 459, 460, 470, 472, 473; 355/46, 33, 54

[56] References Cited

U.S. PATENT DOCUMENTS 4,009,948  3/1977  Boyan et al. .......................... 350/319

OTHER PUBLICATIONS

Wiza, J. L., "Microchannel Plate Detectors", Nuclear Instruments and Methods, vol. 162, pp. 587–601, North Holland Publishing Co., 1979.

Primary Examiner—John K. Corbin
Assistant Examiner—Bruce Y. Arnold

[57] ABSTRACT

An optical device for viewing a sample contained within a holder (e.g., pair of glass slides), featuring an array of lenses and a collimating plate for illuminating spaced-apart narrow areas of the sample, and another lenticular array and collimating plate for viewing the illuminated areas.

13 Claims, 2 Drawing Figures

VIEWER

This application is a continuation-in-part of my U.S. patent application Ser. No. 859,278 filed Dec. 12, 1977 now abandoned.

FIELD OF THE INVENTION

This invention relates to optical devices for viewing a thin sample layer contained between two semitransparent layers.

BACKGROUND OF THE INVENTION

It is often desirable to make a wide area photograph of a frail specimen (e.g., a very thin slice), which must be supported inside a holder of some kind, such as between two microscope slides. Such frail specimens include extremely thin slices (e.g., 0.5 microns), in which the holder is needed for mechanical support, or materials prone to corrosion, in which the holder provides an environmental seal. Because such a specimen cannot be placed in direct contact with film or with a fiber-optic plate, contact prints cannot be made. Instead, photographs are made using a camera held at a suitable distance (for focusing) from the specimen and holder.

SUMMARY OF THE INVENTION

I have discovered a means for making contact prints of specimens while they are contained within semitransparent holders, thus allowing prints to be made with much more compact apparatus than heretofore possible. My invention has application whenever it is desired to view a selected thin layer surrounded on two sides by semitransparent layers. The invention features an array of elongated lenses and a collimating plate for illuminating spaced-apart narrow areas of the selected layer, another lenticular array and collimating plate for viewing light differentially transmitted through the narrow areas, and means for forming images of the narrow areas from the light emerging from the second collimating plate.

In preferred embodiments, the elongated lenses are plano-convex, with the planar surfaces facing the semitransparent layer; a third array of elongated lenses focuses light emerging form the second plate onto a plurality of image areas corresponding to the narrow areas of the selected layer; means are provided for moving (e.g., reciprocally) the viewing and illuminating elements relative to the selected layer by a distance greater than the spacing between the narrow areas, to provide sequential images of all the narrow areas making up the entire selected layer; the collimating plates consist of microchannel plates with a light-absorptive coating on the interior walls of many fine-diameter channels; the microchannel plate is about 100 times as thick as one channel diameter; and the lenses are about as thick and wide as the microchannel plate is thick (e.g., about 2 to 3 mm).

DESCRIPTION OF THE PREFERRED EMBODIMENT

I turn now to the description of the structure, manufacture and operation of a preferred embodiment of the invention.

STRUCTURE

Figure 1:
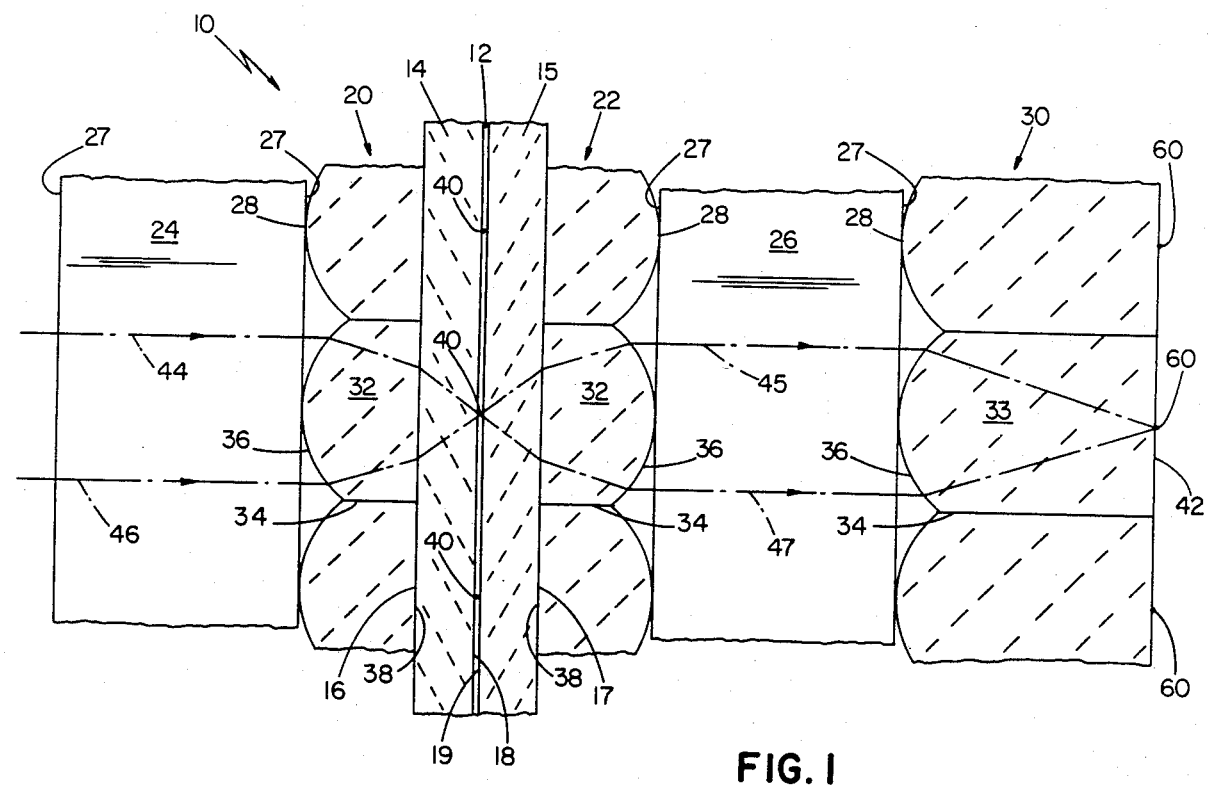
FIG. 1 is a cross-sectional, partial view of said preferred embodiment.

In FIG. 1 there is shown a small portion of optical device 10 adjusted to view planar specimen 12 through glass slides 14, 15. Slides 14, 15 are each 1 mm thick, measured between their parallel, planar outer surfaces 16, 18 and 17, 19, respectively. Specimen 12 is on the order of 0.5 microns thick.

Lenticular arrays 20, 22 abut outer surfaces 16, 17 of slides 14, 15. Microchannel collimating plates 24, 26, each having parallel, 25 micron diameter, collimating channels normal to their exterior surfaces 27, are adhesively bonded to the outside of arrays 20, 22 along tangent lines 28. Third lenticular array 30 is similarly bonded to the other side of plate 26. Each lenticular array is composed of a multiplicity of elongated lenses 32, 33, each lens being of uniform cross-section along its length and having a surface 36, a portion of a cylinder (2 mm radius) and three planar portions (two a portion 34 and one a portion 38), and being adhesively bonded to adjoining lenses at surfaces 34. The lenses of each array 20, 22, 30 are registered with the lenses of the other arrays; i.e., corresponding tangent lines 28 on the arrays are aligned so as to define single planes that are perpendicular to specimen 12. Arrays 20, 22 have a thickness measured between tangent lines 28 and planar surfaces 38, of 1.88 mm. Array 30 is thicker, its width being chosen, as explained further on, to focus light at output surface 42. The individual lenses of all arrays are 3 mm wide, measured between opposing surfaces 34. Plates 24, 26 are 100 channel diameters thick, which is 2.5 mm. All arrays are made from standard fiber-optic glass having a 1.8 index of refractivity.

MANUFACTURE

Manufacturing techniques known in the art are used. Individual lenses 32 (or groups of lenses) are drawn from core bars having shapes similar to the lenses. The drawn lenses are then assembled and bonded together, using techniques known in the art for assembling fiber-optic ribbons.

The microchannel plates are prepared as described at page 592 of Wiza, J. L., "Microchannel Plate Detectors," Nuclear Instruments and Methods, vol. 162, pp. 587–601, North-Holland Publishing Co., which is hereby incorporated by reference. One step of the manufacturing process is to reduce the plates in a hydrogen furnace. This has the effect of blackening the interior walls of the microchannels and thereby giving the walls a light-absorptive coating.

OPERATION

Collimated light produced by passing light through collimating plate 24 is focused by lenticular array 20, which is designed taking into account the refractivity of air slides 14, 15, onto a spaced plurality of narrow areas or lines 40 on specimen 12. These narrow areas are no wider than about 50 microns, which is the smallest dimension that is ordinarily resolvable by the unaided human eye. Further reductions in the widths of these areas could be made if the image produced is to be magnified when viewed. Light paths 44, 46 diagrammatically illustrate the device's operation for one viewed line. The spacing between lines 40 is the 3 mm lens width. Light passes through the lines 40 by differential transmission, and external images 60 of the lines are provided on output surface 42 by the combination of lenticular arrays 22, 30 and collimating plate 26. Light paths 45, 47 illustrate the operation. Principally, only the differentially-transmitted light emanating from lines 40 is passed by collimating plate 26; other light is absorbed by the non-reflecting walls of the microchannel plate because it does not impinge on the plate parallel to the collimating channels.

Figure 2:
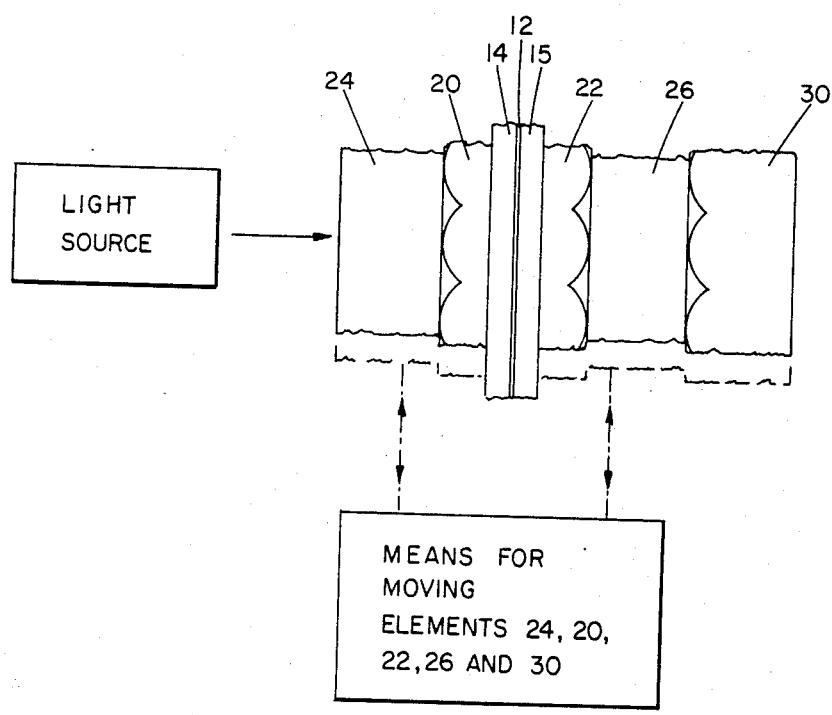
FIG. 2 is a diagrammatic view of said embodiment with the addition of a light source and a means for moving the device relative to the specimen.

At any one time the view of specimen 12 is confined to a single set of lines 40. Further sets of lines making up the full image of the specimen can be viewed by moving the device sideways relative to the specimen while constantly viewing, as shown diagrammatically in FIG. 2 (in which there is shown means for moving elements 24, 20, 22, 26, and 30 relative to the specimen). Movement greater than the 3 mm line spacing will produce a sequential view of all sets of lines on the planar portion.

OTHER EMBODIMENTS

Other embodiments are within the scope of the description and claims. For example, other holders than glass slides could be used, e.g., any semitransparent material not exhibiting an excesssive amount of light scattering. Similarly, low-scattering, semitransparent materials, such as oil, could be used in contact with the specimen between the slides. Also, the movement of the device relative to the object could be done rapidly (e.g., 50 Hz oscillation of 6 mm amplitude) to make the shifting line images appear to the human eye as a steady image of the entire specimen.

What is claimed is:

1. An optical device for viewing an inner layer of material which is at least semitransparent and which is surrounded on two sides by outer layers of material which is also at least semitransparent, said device comprising:

illuminating means for illuminating a plurality of spaced-apart narrow areas of said inner layer, said illuminating means including a first collimating plate arranged to pass light travelling in a direction generally perpendicular to said layers of material and a first array of lenses positioned between said first collimating plate and one of said outer layers, each lens of said first array being elongated in a direction generally parallel to said layers of material and shaped to focus collimated light emerging from said first plate onto one said narrow area of said inner layer, said narrow area extending generally parallel to the direction of elongation of said lens, and viewing means for viewing light transmitted through said plurality of narrow areas, said viewing means including a second collimating plate and a second array of lenses positioned between said second collimating plate and the other of said outer layers, each lens of said second array being elongated in a direction parallel to the elongation direction of said first array and shaped to bend only light transmitted through one said narrow area into the direction of collimation of said second plate, whereby only light from said narrow area is transmitted through said second plate, and means for forming images of said narrow areas from the light transmitted through said second plate.

2. The optical device of claim 1 wherein said lenses of said first and second arrays have one planar surface facing said layers and one convex surface facing said collimating plates.

3. The optical device of claim 1 or 2 wherein said lenses of said first array are identical in shape to, and aligned with, said lenses of said second array.

4. The optical device of claim 1 wherein said means for forming images comprises a third array of elongated lenses, said lenses being elongated in a direction parallel to the elongation direction of said first and second arrays and shaped to focus light emerging from said second collimating plate onto a plurality of spaced apart image areas, each area of said spaced-apart image areas corresponding to one said narrow area on said inner layer.

5. The optical device of claim 1 wherein said outer layers are separate from said inner layer.

6. The optical device of claim 5 wherein said outer layers are glass slides for supporting a frail specimen, which is said inner layer.

7. The optical device of claim 1 wherein there is further provided means for moving said illuminating and viewing means by a distance greater than the spacing between said narrow areas, thereby providing sequential views of various spaced-apart narrow areas, which areas, all together, cover the entire area of said inner layer.

8. The optical device of claim 7 wherein said means for moving provides oscillatory motion to said illumination and viewing means and the frequency of oscillation is sufficient to cause the said sequential views to appear, to the human eye, to be a steady image of the entire area of said inner layer.

9. The optical device of claim 1 wherein said first and second collimating plates comprise microchannel plates with light-absorptive material coating the interior walls of a multiplicity of fine-diameter hollow channels each aligned parallel to the direction of collimation.

10. The optical device of claim 9 wherein each of said microchannel plates has a thickness along the collimating direction of about one-hundred times the internal diameter of its channels.

11. The optical device of claim 10 wherein said channels are on the order of 25 microns in internal diameter.

12. The optical device of claim 10 wherein the thickness along the collimating direction and the transverse width of each lens of said first and said second arrays of lenses is of the same order as the thickness of said microchannel plates.

13. The optical device of claim 12 wherein each lens of said first and said second arrays of lenses is about 2 mm thick along said collimating direction and about 3 mm wide, and said microchannel plates are about 2.5 mm thick.

* * * * *